(12) United States Patent
Isaac et al.

(10) Patent No.: US 8,239,637 B2
(45) Date of Patent: Aug. 7, 2012

(54) BYTE MASK COMMAND FOR MEMORIES

(75) Inventors: Roger Isaac, Santa Clara, CA (US);
Stephan Rosner, Campbell, CA (US);
Qamrul Hasan, Mountain View, CA (US); Jeremy Mah, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 415 days.

(21) Appl. No.: 11/625,158

(22) Filed: Jan. 19, 2007

(65) Prior Publication Data

US 2008/0177931 A1   Jul. 24, 2008

(51) Int. Cl.
*G06F 12/00* (2006.01)
(52) U.S. Cl. ........................................... 711/154
(58) Field of Classification Search .................. None
See application file for complete search history.

(56) References Cited

U.S. PATENT DOCUMENTS

| | | | |
|---|---|---|---|
| 5,321,651 A * | 6/1994 | Monk | 365/189.15 |
| 6,205,046 B1 | 3/2001 | Maesako | |
| 6,571,302 B1 * | 5/2003 | DeWilde et al. | 710/35 |
| 6,880,056 B2 | 4/2005 | Kootstra | |
| 6,954,816 B2 * | 10/2005 | Chiang et al. | 710/305 |
| 7,032,092 B2 | 4/2006 | Lai | |
| 7,082,491 B2 | 7/2006 | Janzen | |
| 7,133,975 B1 | 11/2006 | Isaac et al. | |
| 7,133,995 B1 | 11/2006 | Isaac et al. | |
| 2005/0071543 A1 * | 3/2005 | Ellis et al. | 711/106 |
| 2008/0052474 A1 * | 2/2008 | Xu et al. | 711/154 |

OTHER PUBLICATIONS

PCI Local Bus Specification (3 pages), Revision 2.2, Dec. 18, 1998.*
PCI Local Bus Specification, revision 2.2, Dec. 18, 1998 pp. 17 and 104.*

* cited by examiner

*Primary Examiner* — Duc Doan
(74) *Attorney, Agent, or Firm* — Turocy & Watson, LLP

(57) ABSTRACT

A system is presented that facilitates masking data in write data bound for a memory device. The system contains a memory controller and a memory array communicatively coupled to the memory controller. The memory controller sends a write command and write data to the memory array and the memory array updates data contained therein based upon the write command and write data. If the write operation requires a byte mask, the controller sends a byte mask command via a command bus linking the controller and the memory array. Accordingly, separate and dedicated byte mask pins or bus is not necessary to convey byte mask information.

9 Claims, 6 Drawing Sheets

BYTE MASK COMMAND FOR MEMORIES

BACKGROUND

A byte mask is a collection of bits that indicates to memory systems which bytes of data are updated and which bytes are ignored. The byte mask typically contains one bit for each byte of data. Accordingly, a memory system analyzes each bit of the byte mask to determine whether a corresponding byte of data is updated or ignored.

Typically, memory buses in memory systems use byte mask lanes or pins to communicate byte mask information. These pins are dedicated to transmitting byte mask data. In other words, the byte mask lanes or pins and are not utilized when byte mask information is not required for a particular write operation. As one pin sends one bit of data, the number of byte mask pins required in a memory device is equal to the number of bytes typically sent during a write operation.

However, byte mask data is rarely required for write operations. Byte masks are necessary when individual bytes of write data are to be written and not the entirety of the write data. Accordingly, in the majority of memory write operations, the byte mask pins are idle. Thus, a portion of the external bus and pins are not heavily utilized and occupy valuable space in the memory device.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system that facilitates masking data in a memory write operation without the usage of byte mask pins. The system comprises a byte mask command that is an embedded command similar to a write command or a read command. The byte mask command contains byte mask information for write data bound for a memory array. The system may further involve a memory controller communicatively coupled to the memory array.

According to another aspect of the subject disclosure, the controller sends a write command to the memory array. Additionally, the memory controller sends write data corresponding to the write command. The write data includes the data that is to be written to the memory array according to an address supplied in the write command. If the particular write command requires byte mask information, the memory controller sends a byte mask command. The memory controller sends the byte mask command via the same means the controller sends the write command. Accordingly, byte mask information is provided by a byte mask command as opposed to by dedicated byte mask pins. As a result, the external bus is simplified, the pin count is reduced, and costs associated with making the memory device are reduced.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
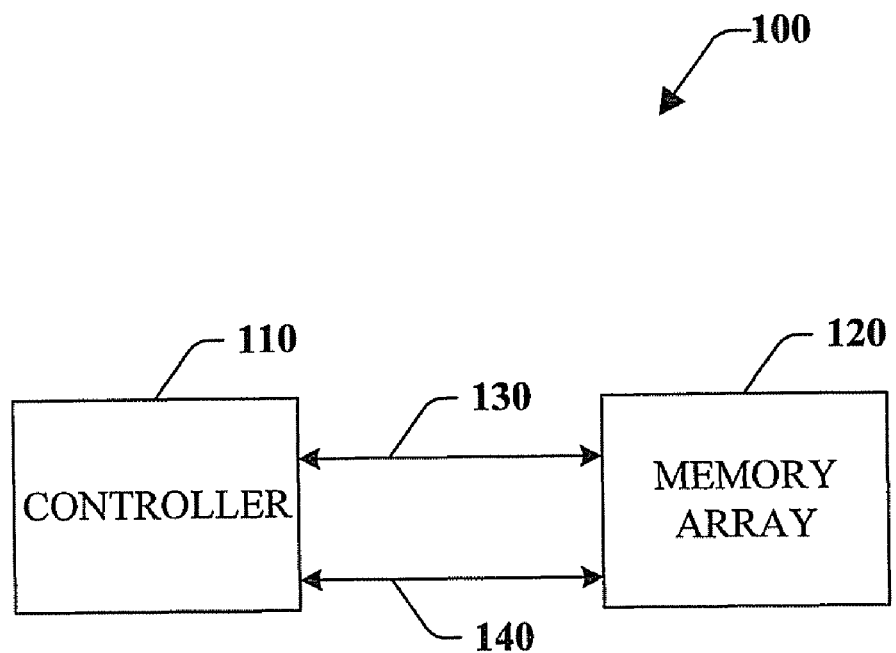
FIG. 1 illustrates a block diagram of a memory system that facilitates data masking without the need for dedicated byte mask pins in one aspect of the invention.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The subject matter disclosed and claimed herein, in one aspect thereof, comprises a system that facilitates masking data in a memory write operation without the usage of byte mask pins. The system comprises a byte mask command that is an embedded command similar to a write command or a read command. The byte mask command includes byte mask information for write data bound for a memory array. The system further includes a memory controller communicatively coupled to the memory array. The system may be advantageously employed in DRAM memory devices, SDRAM memory devices, and specifically DDR (double data rate) memory devices.

For example, in a typically DDR SDRAM system, a write operation may occur as follows. The DDR SDRAM system may have a memory controller and memory bank arrays. At the beginning of a memory write operation, the memory controller sends a memory selection signal. The memory system may include one or more memory bank arrays and the array to which data is to be written is selected by the controller via the memory selection signal. Next, the memory controller sends a write command signal. The write command signal may include an address (e.g., row or column address) in the memory array specifying the location data is to be written. The memory controller may further still supply a data mask signal. The data mask signal includes byte mask information that inhibits writing data to the memory array based upon the data mask signal. The memory controller further provides a memory data signal that carries data to be stored within the memory array. Accordingly, the memory controller is responsible for sending at least 4 different signals to the memory array upon a write operation. These signals require separate lines or pins in order to carry these signals from the memory controller to the memory array. However, as the data mask signal is used only in situations where certain data needs to be prevented from being written to the memory array, it is typically, rarely used.

According to another aspect of the subject disclosure, the controller sends a write command to the memory array. Additionally, the memory controller sends write data corresponding to the write command. The write data includes the data that is to be written to the memory array according to an address supplied in the write command. If the particular write command requires byte mask information, the memory controller sends a byte mask command. The memory controller sends the byte mask command via the same means the controller sends the write command. Accordingly, byte mask information is provided by a byte mask command as opposed to dedicated byte mask pins. Thus, the external bus is simplified and the pin count and cost is reduced.

Referring initially to FIG. 1, a memory device 100 is illustrated. Device 100 includes a controller 110 and a memory array 120. Controller 110 utilizes command bus 130 to indicate the operation to be performed on memory array 120. For example, the operation may be a write operation or a read operation. A write operation stores or writes data to the memory array. A read operation retrieves data from the memory array. To locate a position in the memory array in which the data will be written or read, an address is utilized. The controller 110 may send the address information by utilizing address lines in the command bus 130. Alternatively, a separate address bus can be provided to send the address from the controller 110 to the memory array 120. The memory device can be any of a DRAM device, SRAM device, SDRAM device, or DDR device.

In a write command, a data bus 140 can be provided to transmit the data to be written to the memory array 120. While bus 140 is depicted as distinct from bus 130, it is to be appreciated that bus 140 and 130 can be a single bus wherein several cycles would be needed to fully transmit the address, command, and data. Typically, controller 110 might have separate data mask pins in situations where bytes in the write data on data bus 140 need to be mask. In other situations, the controller 110 might be adapted to send mask information via unused address lines. By way of example, in some burst write operations of SDRAM memory devices, DRAM memory devices, SRAM memory devices and/or DDR memory devices, column address lines may not always be utilized. Thus, data mask information can be sent via the column address lines as opposed to the data mask pins. Nonetheless, this setup will not always be available for every situation in which byte mask information may be required.

If write command writes 32 bits or 4 bytes of data per command, but only 8 bits or one byte needs to be written, a byte mask is utilized. To illustrate further, if the highest order byte of the 32 bit data is the only one being updated, a 4-bit data mask may be used. Only the most significant bit in the 4-bit data mask is set to a value of 1 while the other 3 bits are set to a value of 0, for example. Accordingly, only the highest order byte of the 32 bit data is written while the other 3 bytes are ignored during the write command.

In accordance with an aspect of the subject disclosure, controller 110 utilizes the command bus 130 to send the byte mask data. Accordingly, separate byte mask pins are not required and can be removed. Controller 110 may send the byte mask data using the address lines of the command bus 130. It is to be appreciated that any existing pins in the command bus 130 may be utilized. The byte mask command includes a number of bits corresponding to the total number of bytes in the write data. For example, 4 bytes of write data require a 4-bit byte mask. Further, if a byte mask is not required for a write operation, the controller 110 does not transmit a byte mask command.

Figure 2:
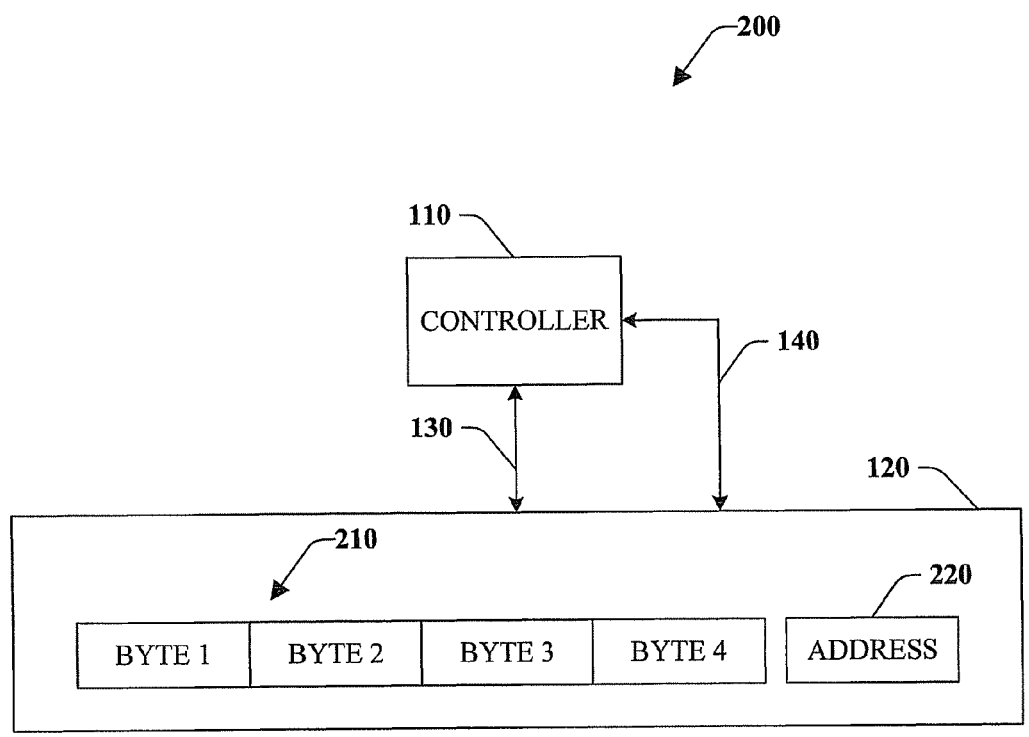
FIG. 2 illustrates a block diagram of a memory module of a system in accordance with an aspect of the subject disclosure.

Turning now to FIG. 2, a memory system 200 further illustrates the operation of the byte mask command. The memory system can be any of a DRAM device, SRAM device, SDRAM device, or DDR device. However, it should be appreciated that any memory device utilizing byte mask information can employ the advantages of the subject disclosure. System 200 includes controller 110 and memory array 120. Controller 110 can be any type of embedded processing unit or semiconductor chip capable of managing the flow of data going to and from the memory array 120. Memory array 120 can be any type of non-volatile memory including but not limited to flash memory. Further, memory array 120 can be of any size required by the specific tasks desired of the memory system 200. For example, memory array 120 can be about 1 gigabyte or about 1,073,741,824 bytes in size.

Memory array 120 includes word 210. While word 210 is depicted in FIG. 2 as 4 bytes wide, it is to be appreciated that any word size can be utilized. For example, the word size can be 8, 16, 32, 64, 128 bits or any other number of bits desired. Word 210 can be accessed by utilizing a corresponding memory address 220. To accomplish a write operation to word 210 at address 220, the controller 110 sends a write command to memory array 120 via the command bus 130. The write command may include address 220 in the address lines of command bus 130. However, it is to be appreciated that a separate bus (not shown) may be utilized to transmit address 220. The controller 110 sends the data to be written to the memory array 120 via the data bus 140. Again, the data bus 140 is depicted a distinct bus from command bus 130 but this need not be the case. A single bus may be utilized and the command, address, and data are transmitted on the single bus separately during different clock cycles of controller 110. Typically, the width of the data sent on data bus 140 is equal to the width of the word utilized by the system. However, it is to be appreciated that the data width on the data bus 140 can be any size other than the word size.

If it is desired that only one byte of word 210 be altered by the write command, a byte mask may be needed. A byte mask may be needed whenever the number desired to be changed by the write command is less than the number of bytes in word 210. To indicate which bytes of word 210 should be updated while the others are ignored, controller 110 sends a byte mask command via the command bus 130. The byte mask typically comprises 1 bit for every 8 bits of data in the data bus 140. By utilizing a separate command transmitted on the command bus 130, the controller 110 need not be provided with distinct byte mask pins. Accordingly, the external bus is simplified and pin count, as well as cost, is reduced.

Figure 3:
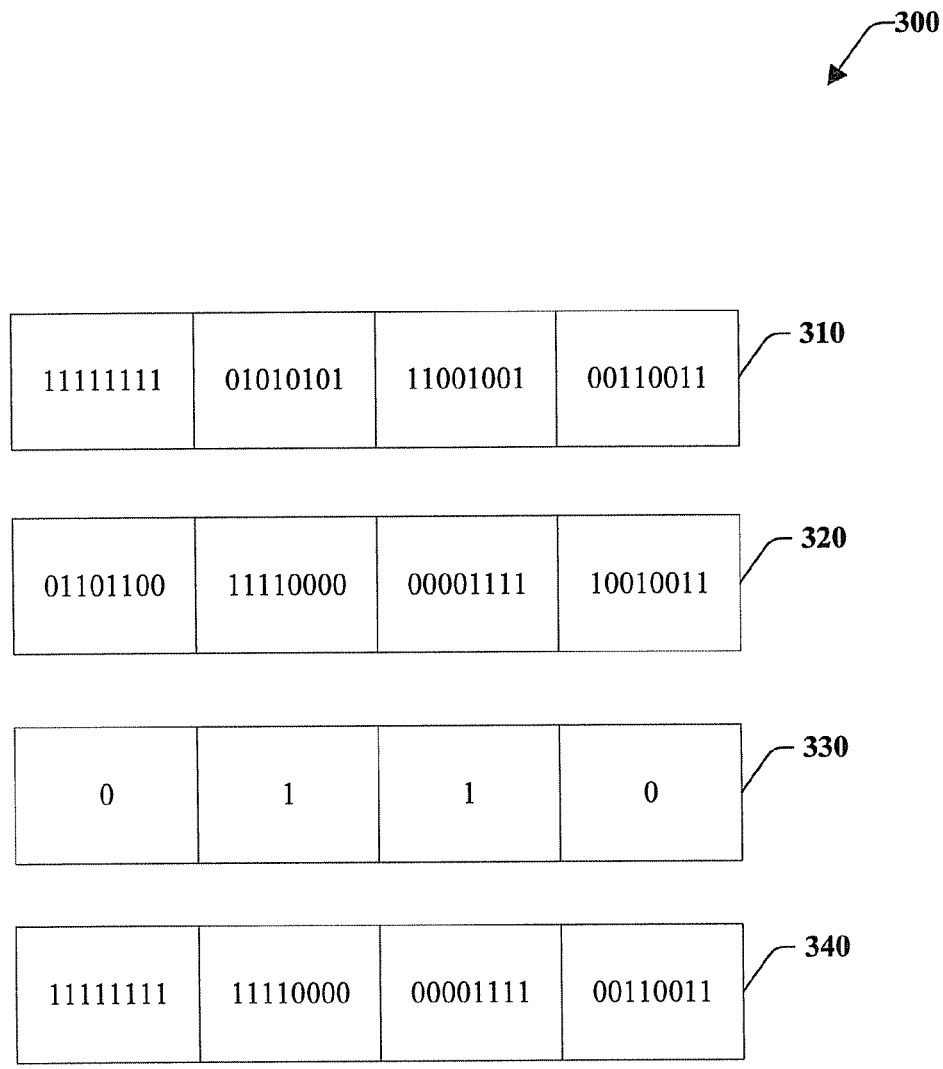
FIG. 3 illustrates a block diagram of a representative operation of a byte mask in one aspect of the invention.

Turning now to FIG. 3, chart 300 illustrates the operation of a byte mask. Chart 300 includes a word of data 310 in memory array 140. For purposes of explanation and to aide in understanding, word 310 is depicted as 4 bytes with each byte comprising 8 bits for example. However, it is to be appreciated that word 310 can be a variety of sizes. Word 310 depicts the state of the data in memory array 140 prior to a write command. Write data 320 is the data transmitted by controller 110 on the data bus 140. Write data 320 is also depicted as 4 bytes of data but it is to be appreciated that write data 320 could be less than or greater than 4 bytes. Byte mask 330 includes 4 bits for example. Each bit of mask 330 corresponds to 8 bits or 1 byte of the write data 320. When reading from left to right, the first bit of mask 330 corresponds to the first 8 bits or first byte of the write data 320. Similarly, the second bit of the mask 330 when reading from left to right corresponds to the second byte or second group of 8 bits of write data 320 and so forth for the remaining bits in the mask 330.

Data word 340 depicts the updated state of word 310 after the write command is completed. Only bytes of word 340 corresponding to a bit value of 1 in byte mask 330 are updated with data from the write data 320. Bytes of write data 320 associated with a bit value of 0 in byte mask 330 are ignored and data word 340 is not updated with those bytes. In the example in FIG. 3, the middle two bits of data mask 330 have a value of 1 while the outer two bits have a bit value of 0. Accordingly, only the middle two bytes of word 310 are updated with write data 320 as the middle bits of byte mask 330 correspond to the middle two bytes of word 310 and write data 320. Thus, the middle two bytes of word 310 are updated with the middle two bytes of write data 320 to create word 340. The outer two bytes of write data 320 are ignored and the outer two bytes of word 310 remain untouched in the transition to word 340.

Figure 4:
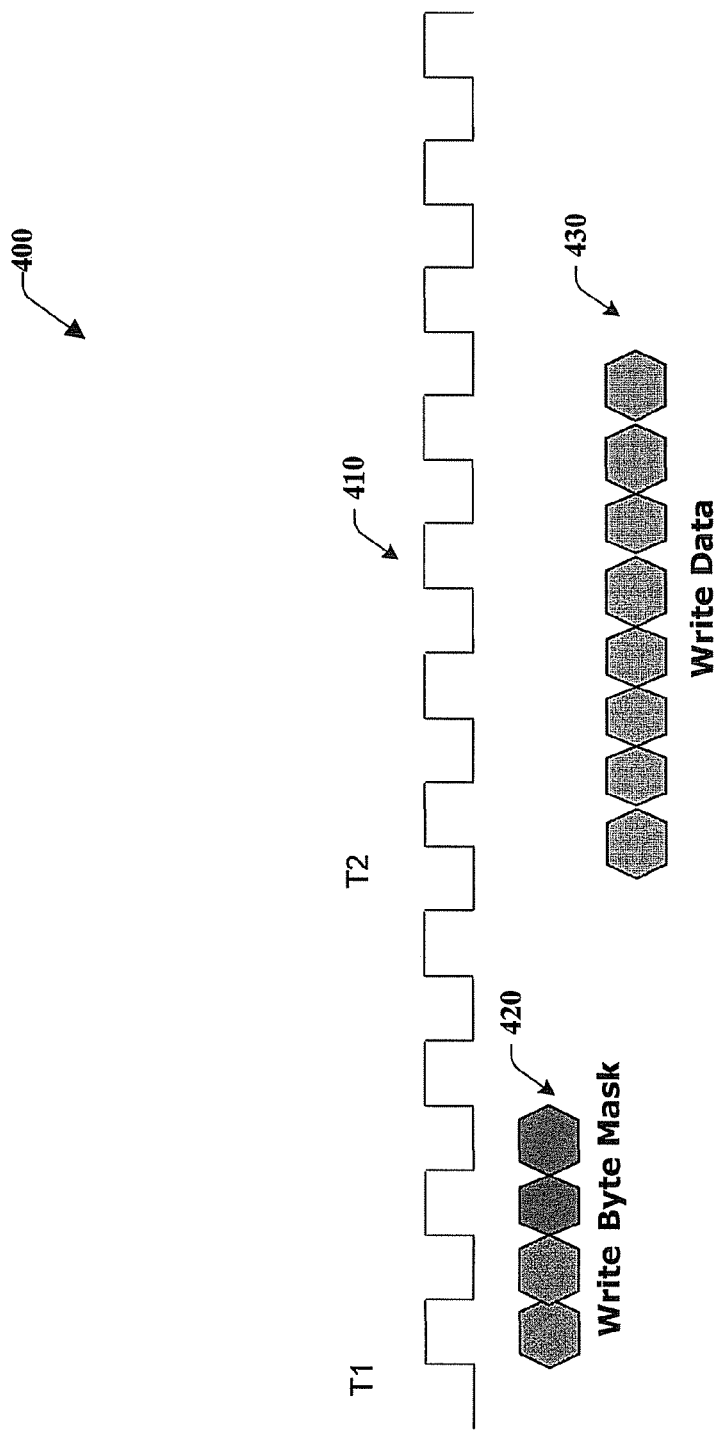
FIG. 4 illustrates a clock cycle diagram of a byte mask operation in one aspect of the invention.

Turning briefly to FIG. 4, a clock cycle diagram 400 of a memory system representative of the subject disclosure is depicted. Diagram 400 includes a clock cycle waveform 410 indicating the clock frequency of the memory system. In diagram 400, time progresses from left to right. Diagram 400 depicts byte mask 420 transmitted by controller 110 at time t1. After transmission of byte mask 420, write data 430 is sent by controller 110 to memory array 120 at time t2. Thus, clock cycle diagram 400 illustrates the byte mask 420 transmitted prior to the write data of the write command. Diagram 400 depicts the byte mask 420 and the write data 430 synchronized to a rising edge of a clock cycle at times t1 and t2 respectively. However, it is to be appreciated that byte mask 420 and write data 430 can be synchronized with a falling edge of a clock cycle.

Figure 5:
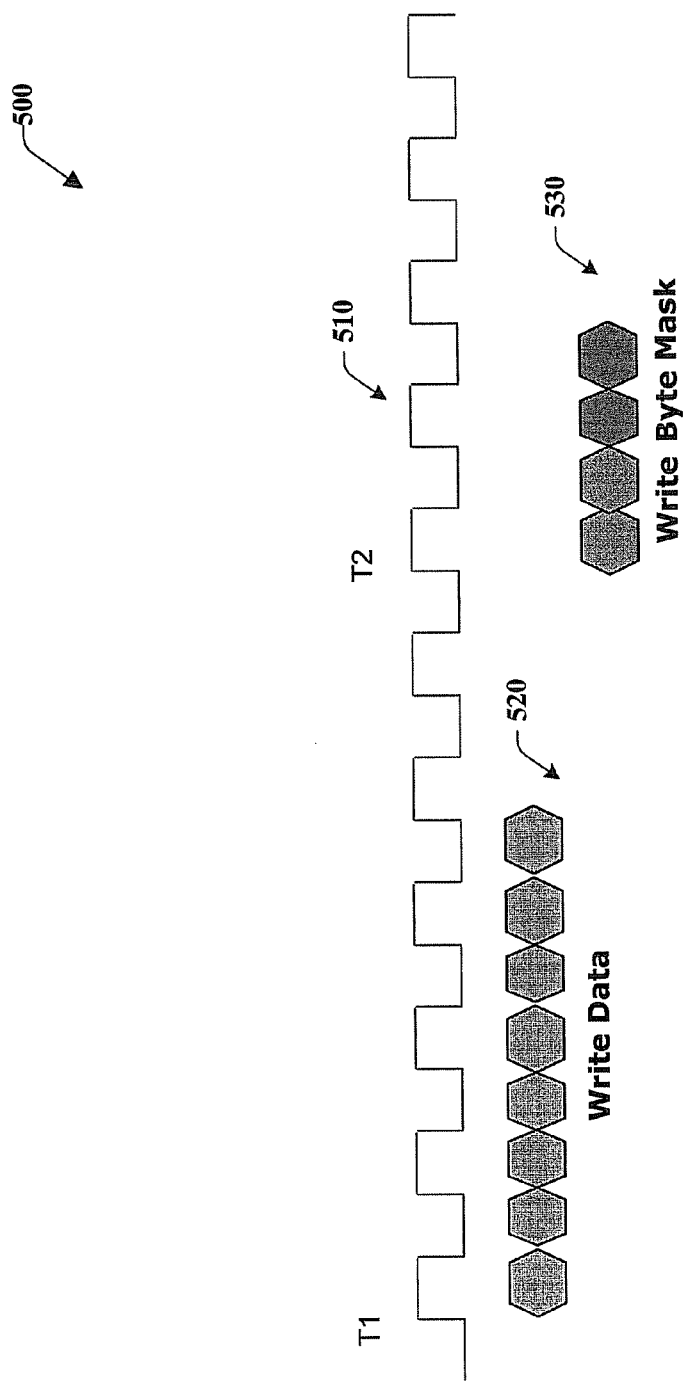
FIG. 5 illustrates a clock cycle diagram of a byte mask operation in one aspect of the invention.

Referring now to FIG. 5, a similar clock cycle diagram 500 in accordance with another aspect of the subject disclosure is shown. Diagram 500 includes a clock cycle waveform 510 wherein the progression of time is from left to right. Diagram 500 depicts write data 520 transmitted by controller 110 to memory array 120 at time t1 in the clock cycle. Byte mask 530 is transmitted to memory array 120 by controller 110 at time t2 in the clock cycle. Thus, clock cycle diagram 500 illustrates the byte mask 530 transmitted after the write data 520 of the write command. Diagram 500 depicts the write data 520 and the byte mask 530 synchronized to a rising edge of a clock cycle at times t1 and t2 respectively. However, it should be appreciated that write data 520 and byte mask 530 can be synchronized with a falling edge of a clock cycle.

Figure 6:
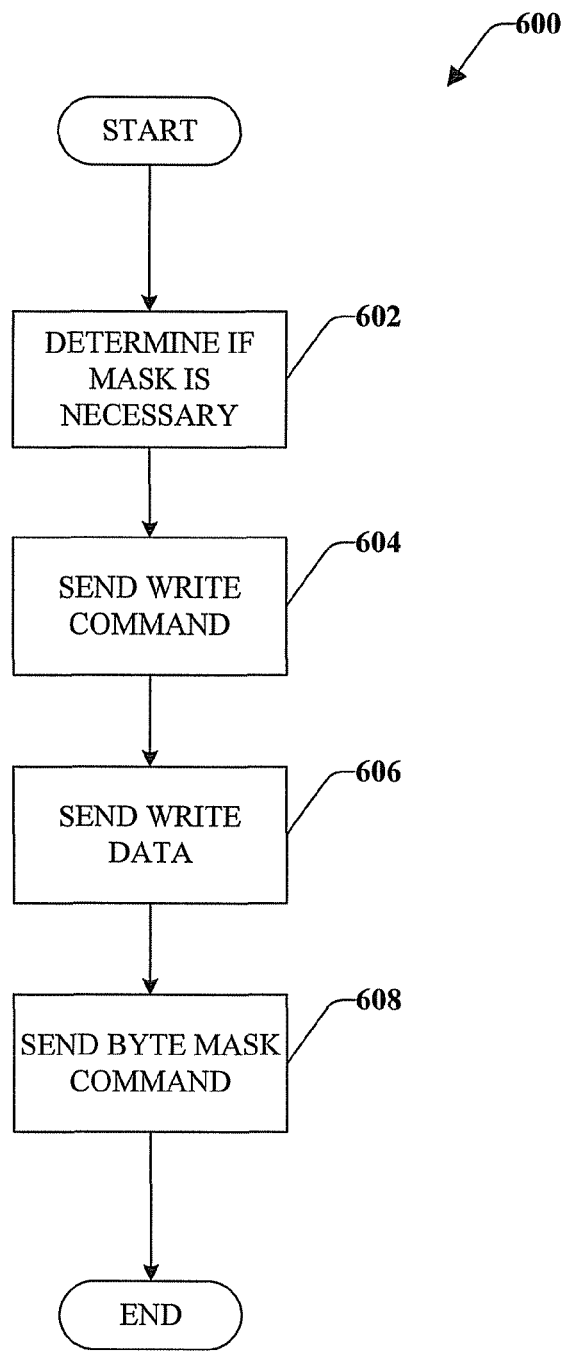
FIG. 6 illustrates a flow chart of a method of masking write data bound for a memory device in one aspect of the invention.

FIG. 6 illustrates a methodology of transmitting a byte mask command containing byte mask data for a write command. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Turning now to FIG. 6, a methodology 600 for utilizing a byte mask in a memory write operation is provided. At reference numeral 602, it is determined whether or not a write a byte mask is necessary. A byte mask is optional and is not utilized for every write command. For example, if no bytes in write data of a write command that need to be ignored, a byte mask is not necessary. At reference numeral 604, a write command is sent on a command bus to a memory array. The write command may include an address of the memory array in which data is to be written. At reference numeral 606, the data to be written is sent to the memory array. It is to be appreciated that reference numeral 604 and 606 may occur concurrently. In other words, the write command may be transmitted at the same time as the write data. When necessary, a byte mask command is sent at reference numeral 608. The byte mask indicates which bytes of the write data are to be updated and which are to be ignored. While method 600 depicts the byte mask transmitted after the write command and write data, it should be appreciated that the byte mask may be transmitted before the write command and write data.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for a controller of a memory device to execute a write operation, comprising:
   initiating the write operation on a memory array;
   transmitting a write command and a write data, via a first bus of the memory device, wherein the first bus comprises a command bus having lines that carry the write command and a byte mask command to the memory array;
   transmitting, when the write operation indicates masking, a byte mask command having byte mask information that comprises one bit for every eight bits of write data associated with the write operation, via the first bus, to the memory array, before transmitting the write data, and wherein the byte mask information is transmitted via column address lines of the address lines of the first bus when the column address lines are not utilized in the write operation, wherein the byte mask command is an embedded command that includes byte mask information for the write operation comprising a byte mask wherein the write command is a disparate command from the byte mask command; and
   transmitting the write data via a second bus of the memory device, to the memory array.

2. The method of claim 1, wherein transmitting the byte mask command further comprises synchronizing the byte mask command and the write data to a rising edge of a clock cycle.

3. The method of claim 1,
   wherein transmitting the byte mask command further comprises synchronizing the byte mask command and the write data to a falling edge of a clock cycle.

4. The method of claim 1, further comprising transmitting an address to the memory array, wherein the address comprises one or more bits and corresponds to an address of the memory array to which the write data is to be written to.

5. The method of claim 4, wherein the transmitting the address further comprises utilizing a third bus of the memory device, the third bus being separate from the first bus and second bus such that separate lines carry the address to the memory array.

6. The method of claim 1, wherein the byte mask includes a bit corresponding to each byte of the write data.

7. The method of claim 6, wherein respective bits of the byte mask indicate whether respective bytes of the write data are to be written or not to be written during the write operation.

8. The method of claim 1, wherein the write data is transmitted to complete the transmission of the write operation.

9. The method of claim 1, wherein the transmitting of the byte mask command is transmitted via the command lines of the first bus.

* * * * *